(12) United States Patent
Gruba et al.

(10) Patent No.: US 7,873,828 B2
(45) Date of Patent: Jan. 18, 2011

(54) METHOD AND APPARATUS FOR ENCRYPTING AND DECRYPTING DATA TO/FROM AN ESCON TAPE SYSTEM

(75) Inventors: Joseph F. Gruba, Erie, CO (US); Gilford C. Fisher, Denver, CO (US); Christopher D. Rigg, Boulder, CO (US)

(73) Assignee: Optica Technologies, Inc., Louisville, CO (US)

( * ) Notice: Subject to any disclaimer, the term of this patent is extended or adjusted under 35 U.S.C. 154(b) by 833 days.

(21) Appl. No.: 11/835,324

(22) Filed: Aug. 7, 2007

(65) Prior Publication Data

US 2009/0041234 A1 Feb. 12, 2009

(51) Int. Cl.
 H04L 29/06 (2006.01)
 G06F 21/00 (2006.01)
 G06F 7/04 (2006.01)
 H04K 1/10 (2006.01)
 H04K 1/06 (2006.01)

(52) U.S. Cl. ............... 713/160; 713/154; 713/182; 726/2; 380/33; 380/37

(58) Field of Classification Search ............... 713/154, 713/160, 182; 726/2; 380/33, 37
 See application file for complete search history.

(56) References Cited

U.S. PATENT DOCUMENTS

| | | | |
|---|---|---|---|
| 5,838,796 A | * | 11/1998 | Mittenthal ............ 380/28 |
| 6,785,815 B1 | * | 8/2004 | Serret-Avila et al. ...... 713/176 |
| 7,079,651 B2 | * | 7/2006 | Den Boer .............. 380/37 |

\* cited by examiner

*Primary Examiner*—Nasser Moazzami
*Assistant Examiner*—Mohammad W Reza
(74) *Attorney, Agent, or Firm*—Cooley LLP

(57) ABSTRACT

A method and apparatus for encrypting data written to an Enterprise System Connection (ESCON) tape system and reading encrypted data from such a tape system and decrypting the encrypted data is described. One illustrative embodiment, in writing encrypted data to an ESCON tape system, receives from a computer over a first ESCON link a command to write a data block of specified size to the ESCON tape system; requests data constituting the data block from the computer in sub-blocks; compresses and encrypts each sub-block to produce a corresponding compressed and encrypted sub-block; and transmits to the ESCON tape system over a second ESCON link the compressed and encrypted sub-blocks using a series of chained-data write operations, the transmitted compressed and encrypted sub-blocks forming a compressed and encrypted data block on a tape of the ESCON tape system.

27 Claims, 12 Drawing Sheets

METHOD AND APPARATUS FOR ENCRYPTING AND DECRYPTING DATA TO/FROM AN ESCON TAPE SYSTEM

FIELD OF THE INVENTION

The present invention relates generally to secure data storage. In particular, but not by way of limitation, the present invention relates to methods and apparatuses for writing encrypted data to an Enterprise System Connection (ESCON) tape system and for reading encrypted data from such a tape system and decrypting the encrypted data.

BACKGROUND OF THE INVENTION

Mainframe computers serve as the operational center for most large companies. These mainframes handle everything from financial management to customer record processing to manufacturing management. To handle these tasks, mainframes are generally connected to a variety of peripheral devices such as tape drives, disk arrays, and so forth.

One common type of peripheral storage device is an Enterprise System Connection (ESCON) tape system. Some industry experts estimate that there are about four million ESCON channels worldwide. Though tape systems based on newer protocols such as Fiber Connection (FICON) and Fibre Channel Protocol (FCP) are available, many companies have elected to continue to use their legacy ESCON tape systems due to the high cost of switching out large numbers of peripherals. As a result, the number of ESCON channels, at present, far exceeds the number of FICON and Fibre-Channel channels.

Due to privacy and identity-theft issues, data encryption has become a must for many financial institutions and other businesses that store sensitive data. This need has been driven in part by legislation such as California's SB 1386 and initiatives such as the Payment Card Industry (PCI) Data Security Standard. The necessity of encrypting data written to peripheral devices presents a serious challenge to companies using legacy ESCON tape systems because the ESCON protocol does not provide natively for data encryption and decryption.

One solution is to feed the ESCON data from the mainframe to a device that converts ESCON data to FCP. The FCP data can in turn be fed to a FCP-compatible compression and encryption device, and the encrypted data can be transmitted to an open-system FCP-compatible tape system. A major disadvantage of this approach is that the enterprise has to replace existing ESCON tape systems with new open-system tape systems at high cost and inconvenience.

Another solution is to replace all ESCON tape systems with current FICON tape systems, which have built-in encryption. Again, a significant disadvantage is the high cost and inconvenience of replacing the legacy ESCON tape systems with new tape systems.

Another solution is to encrypt the data on the mainframe via software before it is sent to the ESCON tape system. This is also a very expensive solution because encryption is highly CPU-intensive, and mainframe usage is charged by the CPU cycles used.

Yet another solution is to eliminate the use of tape drives altogether and to use, for example, disk drives that emulate tape drives. This is also a costly solution.

It is thus apparent that there is a need in the art for an improved method and apparatus for encrypting and decrypting data to/from an ESCON tape system.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

The present invention can provide a method and apparatus for encrypting data written to an ESCON tape system and reading encrypted data from such a tape system and decrypting the encrypted data. One illustrative embodiment is a method for writing encrypted data to an Enterprise System Connection (ESCON) tape system, comprising receiving from a computer over a first ESCON link a command to write a data block of specified size to the ESCON tape system; requesting data constituting the data block from the computer in sub-blocks, each sub-block being smaller in size than the data block when the data block is larger than a sub-block; compressing and encrypting each sub-block to produce a corresponding compressed and encrypted sub-block; and transmitting to the ESCON tape system over a second ESCON link the compressed and encrypted sub-blocks using a series of chained-data write operations, the transmitted compressed and encrypted sub-blocks forming a compressed and encrypted data block on a tape of the ESCON tape system Another illustrative embodiment is a data encryption apparatus for reading encrypted data from an ESCON tape system, comprising a first ESCON-compatible communication module capable of being connected with a computer over a first ESCON link; a second ESCON-compatible communication module capable of being connected with an ESCON tape system over a second ESCON link; a data compression and encryption subsystem; and control logic configured to receive from the computer via the first ESCON-compatible communication module a command to read a compressed and encrypted data block from the ESCON tape system; read from the ESCON tape system, via the second ESCON-compatible communication module, block metadata associated with the compressed and encrypted data block and sub-block metadata associated with a first compressed and encrypted sub-block of the compressed and encrypted data block, the sub-block metadata associated with the first compressed and encrypted sub-block including an indication of the size, on a tape of the ESCON tape system, of the first compressed and encrypted sub-block; read repeatedly as a unit from the ESCON tape system via the second ESCON-compatible communication module using data chaining, commencing with the first compressed and encrypted sub-block, a compressed and encrypted sub-block and sub-block metadata associated with a next compressed and encrypted sub-block until a last compressed and encrypted sub-block in the compressed and encrypted data block is read, the sub-block metadata associated with the next compressed and encrypted sub-block including an indication of the size, on the tape, of the next compressed and encrypted sub-block, the data compression and encryption subsystem being configured to decrypt and decompress each read compressed and encrypted sub-block to produce a corresponding uncompressed and unencrypted sub-block; and transmit to the computer, via the first ESCON-compatible communication module, the uncompressed and unencrypted sub-blocks.

These and other embodiments are described in further detail herein.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings, wherein:

DETAILED DESCRIPTION

In an illustrative embodiment of the invention, data encryption is provided between a computer and an Enterprise System Connection (ESCON) tape system by processing in-line ESCON data in a manner that is transparent, high in throughput, and low in latency. ESCON data to be encrypted and written to the ESCON tape system is subdivided into sub-blocks that are dimensioned for rapid and efficient compression/encryption and decryption/decompression. The compressed and encrypted data is written to the ESCON tape system in a manner that allows the sub-blocks to be read back and reassembled into an uncompressed and unencrypted data block for use by the computer.

Figure 1A:
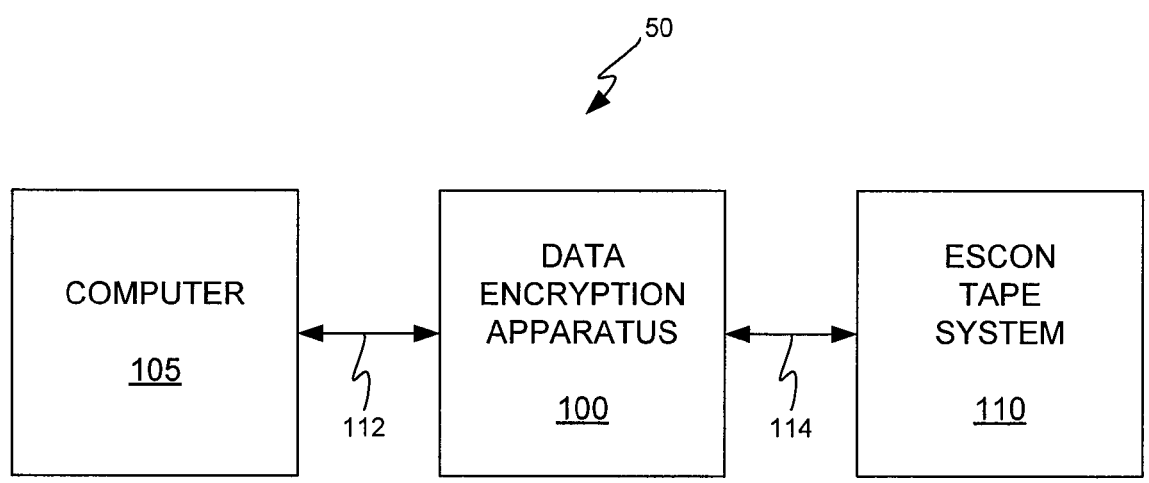
FIG. 1A is a block diagram of an environment that includes a data encryption apparatus in accordance with an illustrative embodiment of the invention.

Referring now to the drawings, where like or similar elements are designated with identical reference numerals throughout the several views, and referring in particular to FIG. 1A, it is a block diagram of an environment 50 that includes a data encryption apparatus 100 in accordance with an illustrative embodiment of the invention. When instructed to do so, data encryption apparatus 100 encrypts data received from computer 105 and writes the encrypted data to ESCON tape system 110. Likewise, when instructed to do so, data encryption apparatus 100 decrypts encrypted data read from ESCON tape system 110 and transmits the decrypted data to computer 1 05.

Data encryption apparatus 100 communicates with computer 105 over ESCON link 112 and communicates with ESCON tape system 110 over ESCON link 114. In one illustrative embodiment, computer 105 is a mainframe computer. In general, computer 105 is any type of computer that is capable of transmitting data to and receiving data from an ESCON tape system. In some embodiments, ESCON tape system 110 employs tape cartridges. In other embodiments, reel-to-reel tapes are used. In some embodiments, data encryption apparatus 100 and tape system 110 may be capable of supporting multiple simultaneous ESCON channels.

Figure 1B:
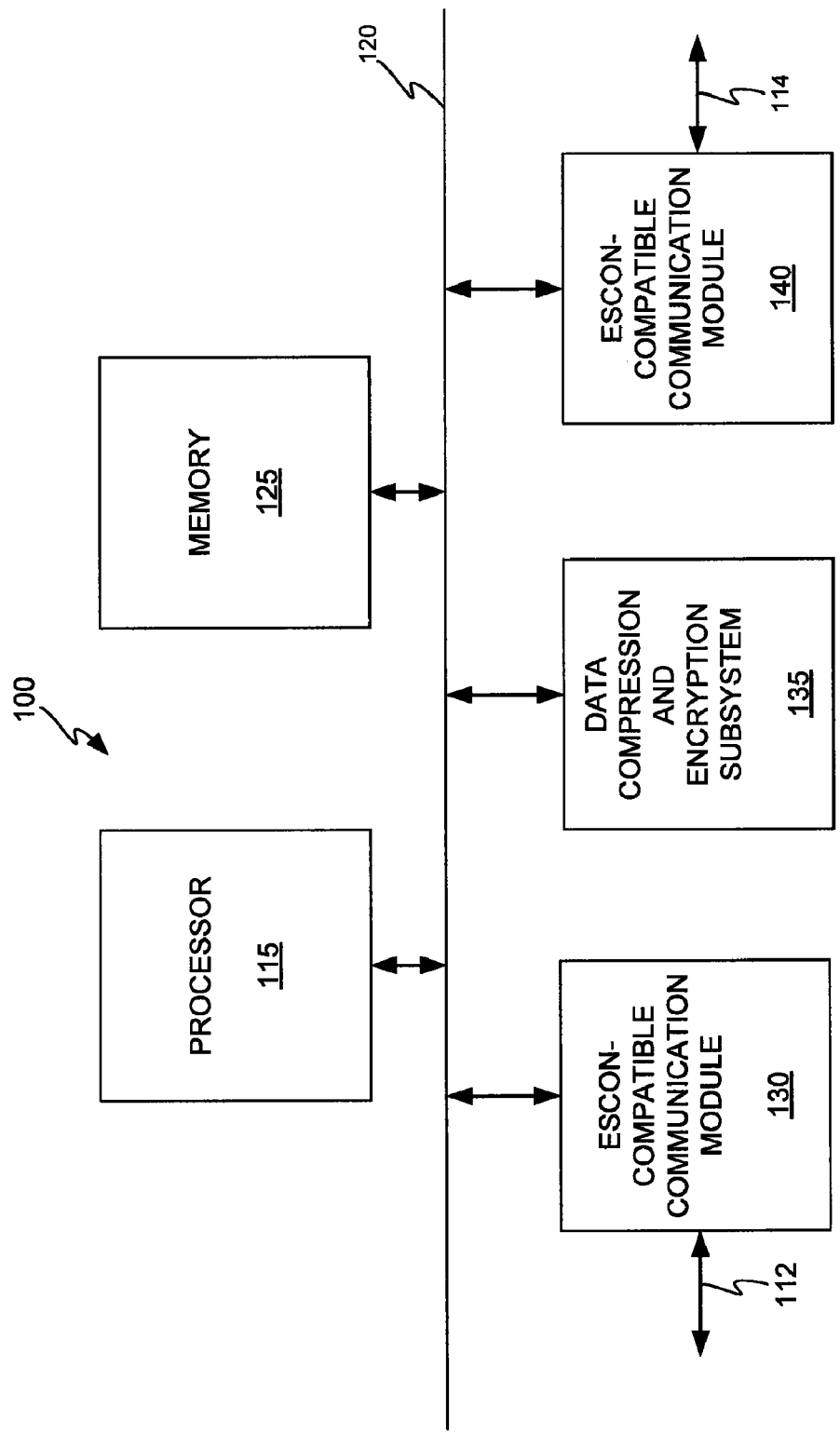
FIG. 1B is a functional block diagram of a data encryption apparatus in accordance with an illustrative embodiment of the invention.

FIG. 1B is a functional block diagram of data encryption apparatus 100 in accordance with an illustrative embodiment of the invention. In FIG. 1B, processor 115 communicates over data bus 120 with memory 125, ESCON-compatible communication module 130, data compression and encryption subsystem 135, and ESCON-compatible communication module 140.

In FIG. 1B, processor 115 is a functional representation. In some embodiments, data encryption apparatus 100 may include multiple processors or CPUs (central processing units).

ESCON-compatible communication module 130 receives data from and transmits data to computer 105 over ESCON link 112. Similarly, ESCON-compatible communication module 140 transmits data to and receives data from ESCON tape system 110 over ESCON link 114. In one embodiment, each of ESCON-compatible communication modules 130 and 140 is implemented as a four-port ESCON card manufactured and sold by Optica Technologies Incorporated. Note that, in this embodiment, ESCON-compatible communication modules 130 and 140 include multiple ESCON ports to support multiple simultaneous ESCON channels. In another embodiment, the functionality of ESCON-compatible communication modules 130 and 140 and of data compression and encryption subsystem 135 is implemented on a single circuit board.

Data compression and encryption subsystem 135 compresses and encrypts data received from computer 105 via ESCON-compatible communication module 130. Data compression and encryption subsystem 135 also decrypts and decompresses compressed and encrypted data read back from ESCON tape system 110 via ESCON-compatible communication module 140. In one embodiment, data compression and encryption subsystem 135 is implemented as an 8155HXL Security Acceleration Board manufactured and sold by Hifn, Inc. As mentioned above, in another embodiment, the functionality of data compression and encryption subsystem 135 is implemented together with that of ESCON-compatible communication modules 130 and 140 on the same circuit board.

Memory 125 in FIG. 1B is also a functional representation. Depending on the particular embodiment, memory 125 can include, without limitation, random-access memory (RAM), read-only memory (ROM), flash memory, magnetic storage, optical storage, or a combination of these.

Figure 1C:
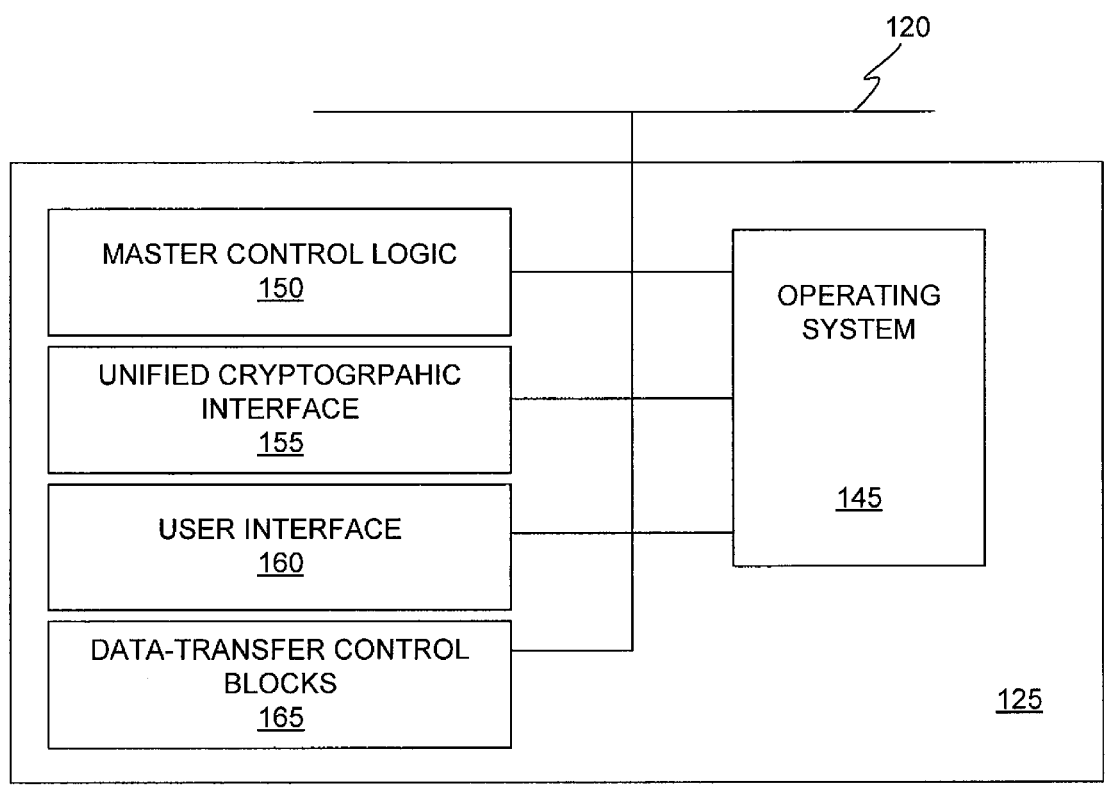
FIG. 1C is a diagram of a memory of the data encryption apparatus shown in FIG. 1B in accordance with an illustrative embodiment of the invention.

FIG. 1C is a diagram of memory 125 in accordance with an illustrative embodiment of the invention. Memory 125 includes, among other things, operating system 145. In one embodiment, data encryption apparatus 100 is implemented on an INTEL server running the LINUX operating system. In other embodiments, different hardware architectures and operating systems can be employed.

In this illustrative embodiment, memory 125 also includes the following functional units: master control logic 150, unified cryptographic interface (UCI) 155, user interface 160, and data-transfer control blocks (DTCBS) 165. In one illustrative embodiment, these functional units are implemented as software or firmware that is executed by processor 115. In general, the functionality of these functional units can be implemented in hardware, software, firmware, or a combination of these. Also, depending on the particular embodiment, these functional units may be subdivided or combined in ways other than that indicated in FIG. 1C.

Master control logic 150, in some embodiments referred to as the "tape crypto" functional unit, controls the movement of data through data encryption apparatus 100. Master control logic 150 detects requests from computer 105 for the encryption or decryption of data transmitted between computer 105 and ESCON tape system 110. In one illustrative embodiment, master control logic 150 includes a tape-position state machine that determines the current position of a tape of ESCON tape system 110. Tracking the position of the tape allows data encryption apparatus 100 to locate important data located at the beginning of a tape.

In some embodiments, UCI 155 provides cryptographic-key creation and management functions within data encryption apparatus 100. In other embodiments, UCI 155 communicates with an external key manager, which may be controlled by a third party. The cryptographic aspects of data encryption apparatus 100 can be implemented in a variety of ways that are well known to those skilled in the applicable art.

In one illustrative embodiment, a unique cryptographic key is stored on each tape that contains data encrypted by data encryption apparatus 100. This unique tape key, which permits encrypted data stored on the corresponding tape to be decrypted, is itself "wrapped"-protected with an asymmetric public-private key pair to protect it against unauthorized access. In some embodiments, data is encrypted (or not) and the tape key is wrapped, if the data is encrypted, based on the volume serial number or the owner ID of the tape. In some embodiments, all of the tape keys associated with a particular enterprise can be "unwrapped" using a single organizational key. In one such embodiment, the organizational key is an asymmetric public-private key pair that is used in the process of wrapping the tape key along with another ephemeral public-private key pair.

User interface 160 enables an operator to configure the operation of data encryption apparatus 100. For example, via user interface 160, an operator can configure data encryption apparatus 100 to encrypt a particular tape associated with a particular volume serial number. In one embodiment, user interface 160 is a Web-based interface that is accessible via a Web-browser application such as INTERNET EXPLORER. In this embodiment, the operator accesses a prearranged Internet Protocol (IP) address via the browser application to input commands to and change the settings of data encryption apparatus 100. In other embodiments, user interface 160 can be implemented as a command-line-type user interface or as a graphical user interface (GUI) other than a Web-based user interface.

The purpose and use of DTCBs 165 is explained below.

Figure 2:
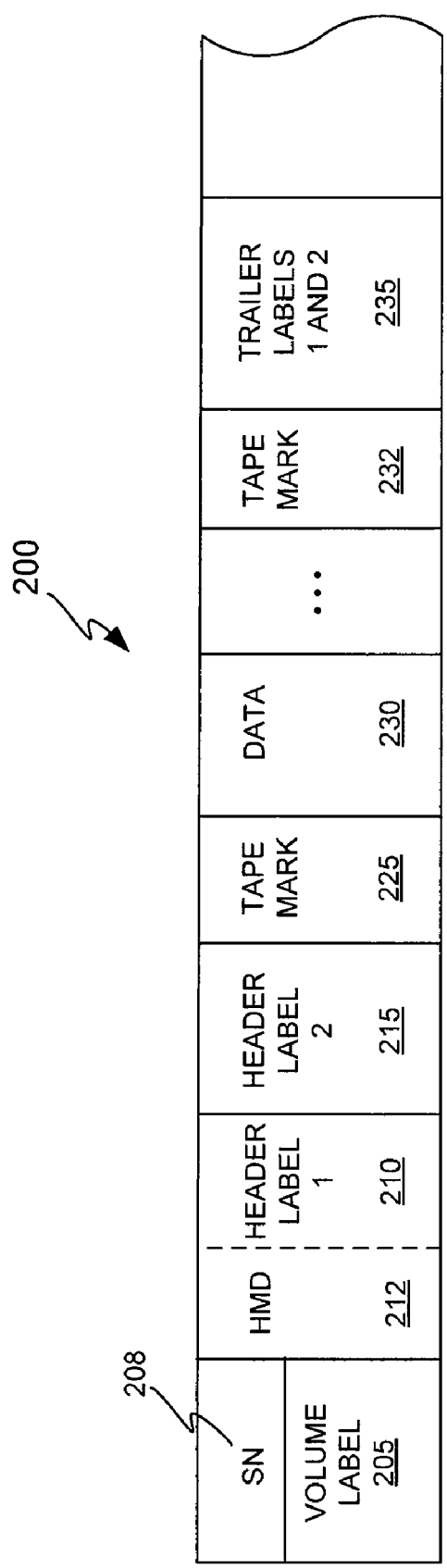
FIG. 2 is a diagram of the data format of a standard-label tape suitable for use with a data encryption apparatus in accordance with an illustrative embodiment of the invention.

FIG. 2 is a diagram of the data format of a standard-label tape suitable for use with a data encryption apparatus in accordance with an illustrative embodiment of the invention. On a standard-label tape, data is stored in "blocks." A block is a physical entity on the tape that can vary in size in accordance with certain rules that are well-known in the art. Each data block includes opening and closing indicators and information on its size. ESCON tape system 110 is capable of detecting these opening and closing indicators.

On a standard-label tape, blocks are numbered starting at "0." Block 0 is often referred to as the "Volume Label." Block 1 is called "Header Label 1"; Block 2, "Header Label 2." "Tape marks" are used to separate groups of blocks on the tape. A collection of blocks between a pair of tape marks is called a "file" or a "data set." The end of the volume is indicated by two consecutive tape marks.

Referring now to FIG. 2, this illustrative portion of a standard-label tape 200 includes Volume Label 205, which in turn includes volume serial number 208; Header Label 1 210, which includes header metadata 212; Header Label 2 215; an initial tape mark 225; data 230; a terminating tape mark 232; and Trailer Labels 1 and 2 235. Note that in an embodiment in which a wrapped tape key is stored on each tape 200, the "key blob" containing the wrapped tape key can be stored as part of the header metadata 212.

Figure 3:
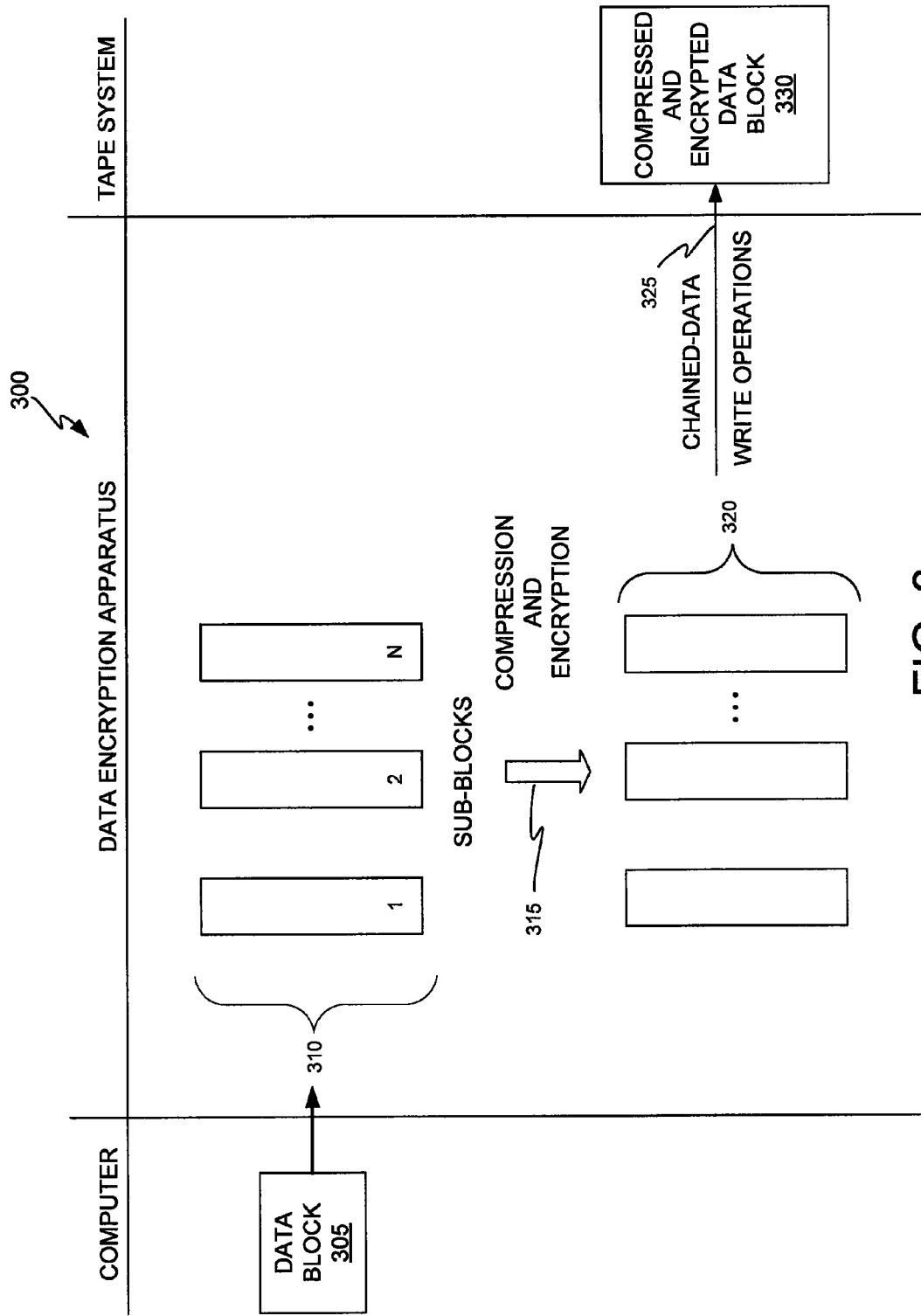
FIG. 3 is a data flow diagram illustrating how encrypted data is written to an ESCON tape system in accordance with an illustrative embodiment of the invention.

FIG. 3 is a data flow diagram 300 illustrating how data encryption apparatus 100 writes encrypted data to ESCON tape system 110 in accordance with an illustrative embodiment of the invention. In this particular embodiment, data encryption apparatus 100 receives a command from computer 105 via ESCON-compatible communication module 130 to write a data block 305 of specified size to ESCON tape system 110. Master control logic 150 requests the data constituting data block 305 from computer 105 in sub-blocks 310 using as many such requests as are needed. When data block 305 is larger than a single sub-block 310, each sub-block 310 is smaller than data block 305. That is, when data block 305 is sufficiently large, it is subdivided into sub-blocks 310.

Sub-blocks 310 are dimensioned such that data compression and encryption subsystem 135 can compress and encrypt the data efficiently and data encryption apparatus 100 can process data with an acceptable level of latency. In some embodiments, all sub-blocks 310 are of equal size except for a residual sub-block that occurs when data block 305 does not divide evenly into sub-blocks 310. In one particular embodiment, each sub-block 310 (other than the residual sub-block just mentioned) is 2 KB (2048 bytes) in size. This sub-block size has been found in practice to be a good tradeoff between compression and encryption efficiency and latency.

Data compression and encryption subsystem 135 compresses and encrypts each sub-block 310 (compression and encryption 315 in FIG. 3) to produce a corresponding compressed and encrypted sub-block 320. Note that even if sub-blocks 310 are of equal size as illustrated in FIG. 3, the compressed and encrypted sub-blocks 320 may vary in size, and a given compressed and encrypted sub-block 320 may differ in size from the original sub-block 310 to which it corresponds.

Master control logic 150 transmits the compressed and encrypted sub-blocks 320 to ESCON tape system 110 via ESCON-compatible communication module 140. To ensure that the separate compressed and encrypted sub-blocks 320 form a single compressed and encrypted data block 330 on ESCON tape system 110, master control logic 150 transmits the compressed and encrypted sub-blocks 320 to ESCON tape system 110 using a series of chained-data write operations 325. A chained-data write operation is one in which indication is given to the receiving device that only a portion of a data block has been transmitted in connection with that particular write operation. This informs the receiving device that the data block is to be continued in subsequent chained-data write operations until the final segment of data in the data block has been received.

Figure 4:
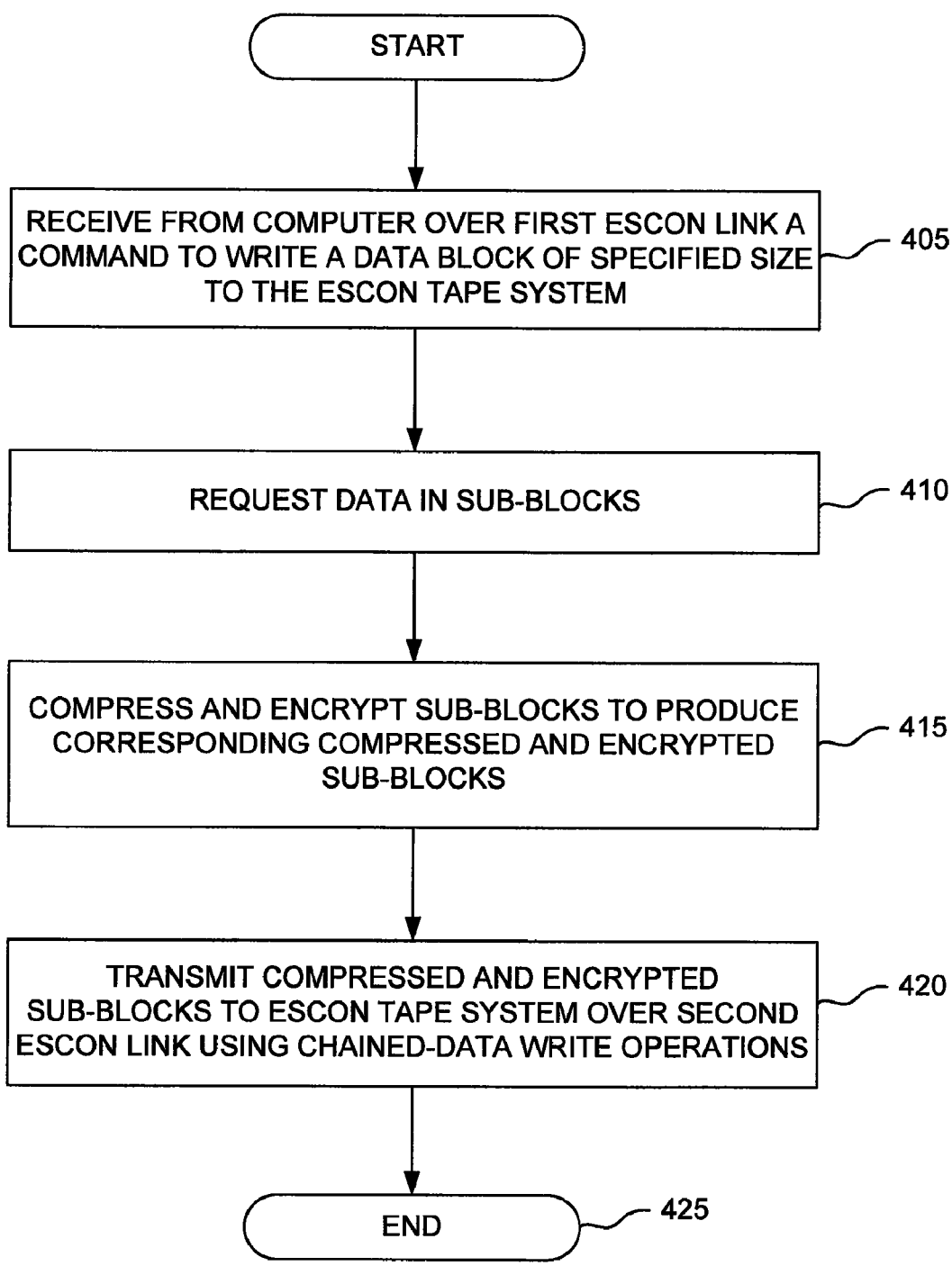
FIG. 4 is a flowchart of a method for writing encrypted data to an ESCON tape system in accordance with an illustrative embodiment of the invention.

FIG. 4 is a flowchart of a method for writing encrypted data to an ESCON tape system in accordance with an illustrative embodiment of the invention. At 405, master control logic 150 receives from computer 105 over ESCON link 112 a command to write a data block 305 of specified size to ESCON tape system 110. At 410, master control logic 150 requests the data constituting data block 305 in sub-blocks 310, as explained above. At 415, data compression and encryption subsystem 135 compresses and encrypts each sub-block 310 to produce a corresponding compressed and encrypted sub-block 320. At 420, master control logic 150 transmits the compressed and encrypted sub-blocks 320 to ESCON tape system 110 over ESCON link 114 using a series of chained-data write operations 325, the transmitted compressed and encrypted sub-blocks 320 forming a compressed and encrypted data block 330 on a tape of the ESCON tape system 110. The process terminates at 425.

Figure 5:
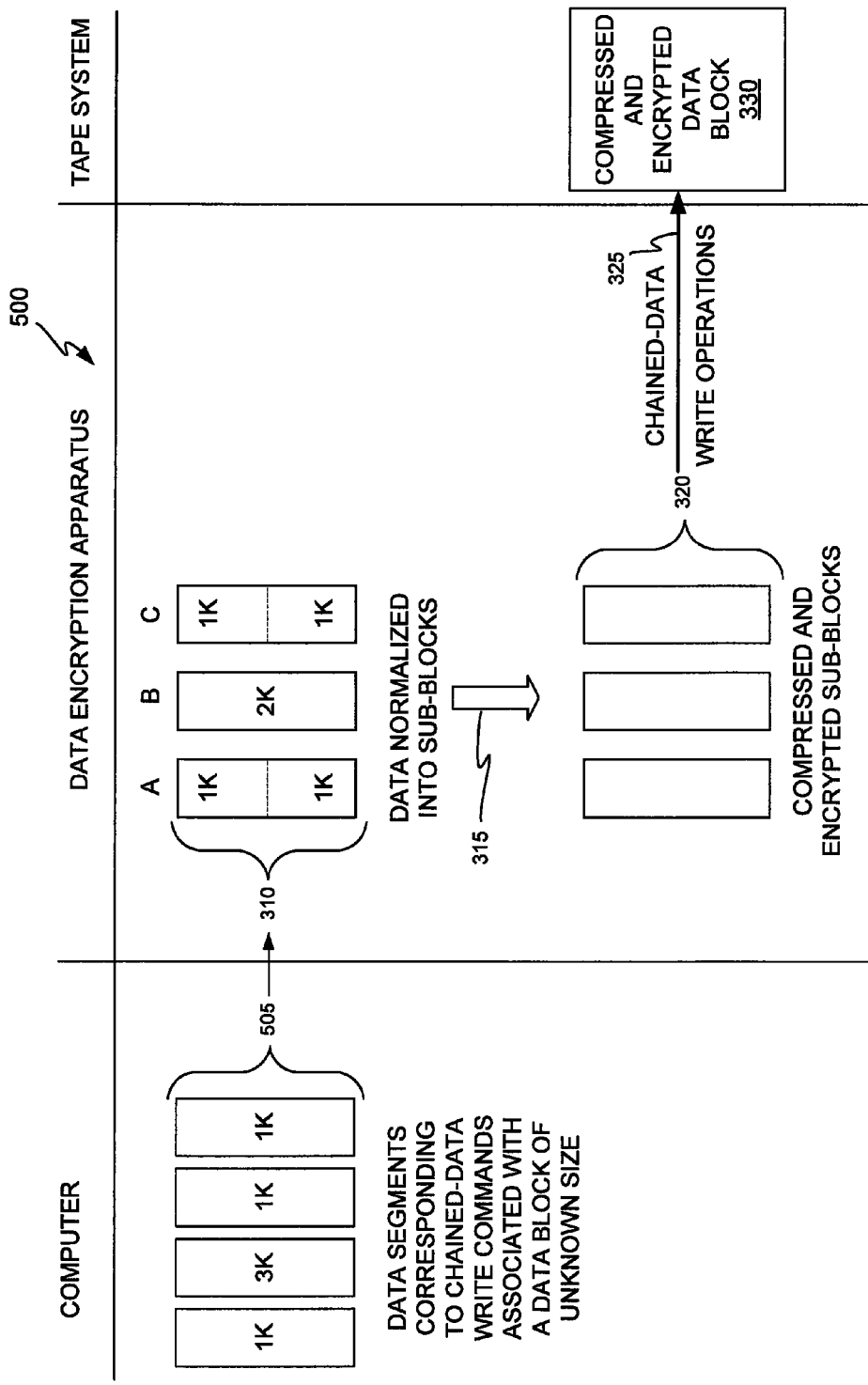
FIG. 5 is a data flow diagram illustrating how encrypted data is written to an ESCON tape system in accordance with another illustrative embodiment of the invention.

FIG. 5 is a data flow diagram 500 illustrating how data encryption apparatus 100 writes encrypted data to ESCON tape system 110 in accordance with another illustrative embodiment of the invention. In this embodiment, data encryption apparatus 100 receives from computer 105 via ESCON-compatible communication module 130 a series of chained-data write commands associated with a data block of unknown size. Each chained-data write command from computer 105 is associated with a data segment 505 making up a portion of the data block. In this embodiment, master control logic 150 requests and receives from computer 105, via ESCON-compatible communication module 130, data constituting the data block in units of variable size as needed, depending on the size of each successive data segment 505, to normalize the data segments 505 into sub-blocks 310.

In the specific and simplified example shown in FIG. 5, computer 105 transmits a data block made up of four segments 505 of size 1 KB, 3 KB, 1 KB, and 1 KB, respectively. In this example, it will be assumed that each sub-block 310 is 2 KB in size and that the segments 505 are transmitted in the order listed above. Since the first (1-KB) segment 505 is smaller than a sub-block 310, master control logic 150 places this first 1-KB segment 505 in a first sub-block 310 (labeled "A" in FIG. 5). Since the second (3-KB) segment 505 is larger than a sub-block 310, master control logic 150 requests only the first 1 KB of this segment 505 and uses it to complete the first sub-block 310 (A).

Master control logic 150 then requests the remaining 2 KB of the 3-KB segment 505 and uses that to fill a second sub-block 310 (labeled "B" in FIG. 5). Finally, master control logic 150 reads the third and fourth segments 505 (each 1 KB in size) and places them in a third sub-block 310 (labeled "C" in FIG. 5).

In this manner, master control logic 150 normalizes the irregularly-sized segments 505 associated with the chained-data write commands from computer 105 into sub-blocks 310 of a desired size. As explained above, the 2-KB sub-blocks 310 shown in FIG. 5 are merely one example. In other embodiments, the sub-blocks 310 may be of a size other than 2 KB.

Data compression and encryption subsystem 135 compresses and encrypts each sub-block 310 (compression and encryption 315 in FIG. 5) to produce a corresponding compressed and encrypted sub-block 320. Note that even if sub-blocks 310 are of equal size as illustrated in FIG. 5, the compressed and encrypted sub-blocks 320 may vary in size, and a given compressed and encrypted sub-block 320 may differ in size from the original sub-block 310 to which it corresponds.

Master control logic 150 transmits the compressed and encrypted sub-blocks 320 to ESCON tape system 110 as explained above in connection with FIG. 3.

Figure 6:
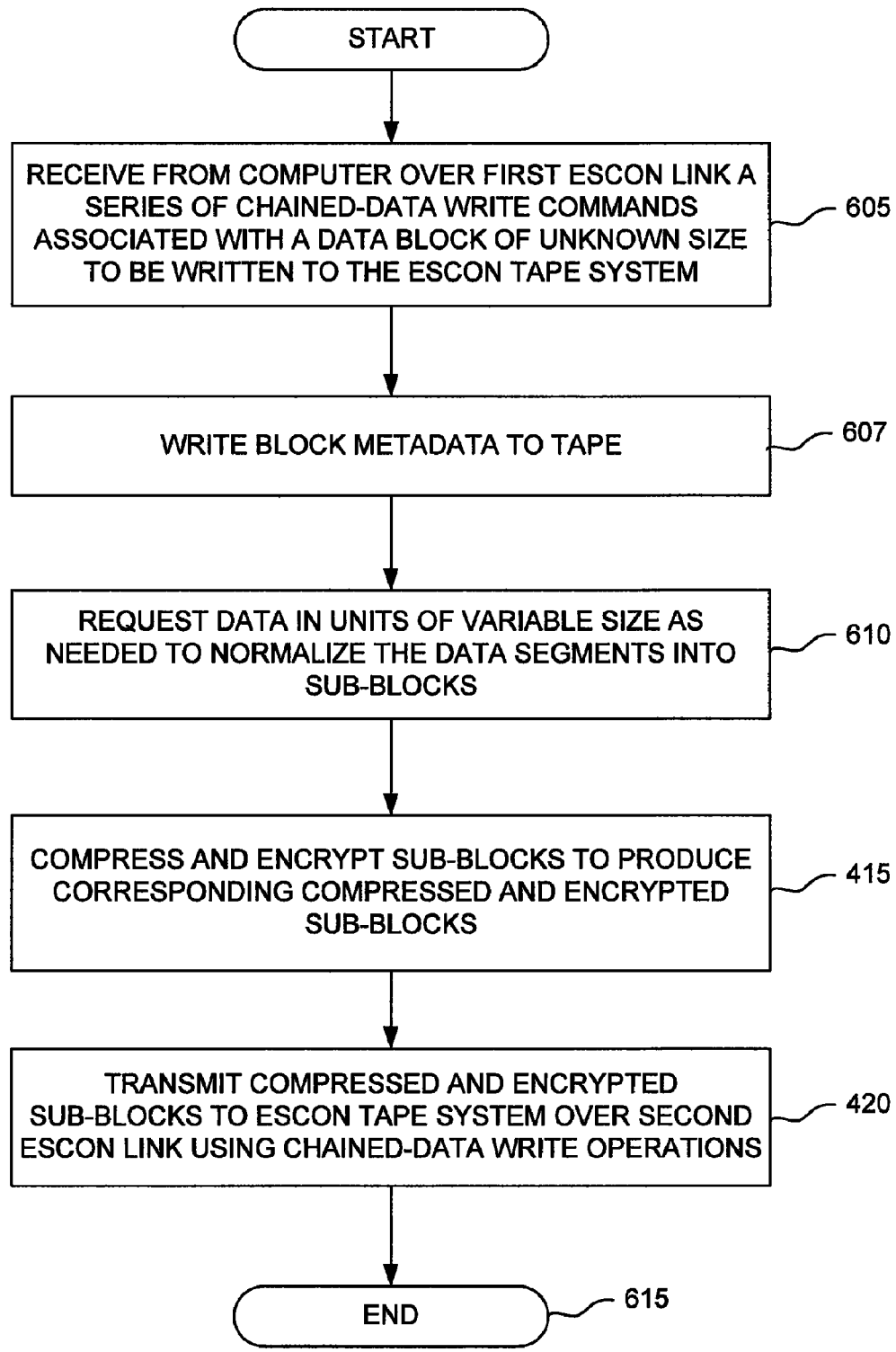
FIG. 6 is a flowchart of a method for writing encrypted data to an ESCON tape system in accordance with another illustrative embodiment of the invention.

FIG. 6 is a flowchart of a method for writing encrypted data to an ESCON tape system in accordance with another illustrative embodiment of the invention. At 605, master control logic 150 receives from computer 105 over ESCON link 112 a series of chained-data write commands associated with a data block of unknown size to be written to ESCON tape system 110, each chained-data write command being associated with a data segment 505 making up a portion of the data block of unknown size. At 607, master control logic 150 writes block metadata to ESCON tape system 110. This block metadata is explained in further detail below in connection with FIG. 7. At 610, master control logic 150 requests the data constituting the data block in units of variable size as needed to normalize the data segments 505 into sub-blocks 310, as explained above. After Blocks 415 and 420 have been performed as explained above in connection with FIG. 4, the process terminates at 615.

Figure 7:
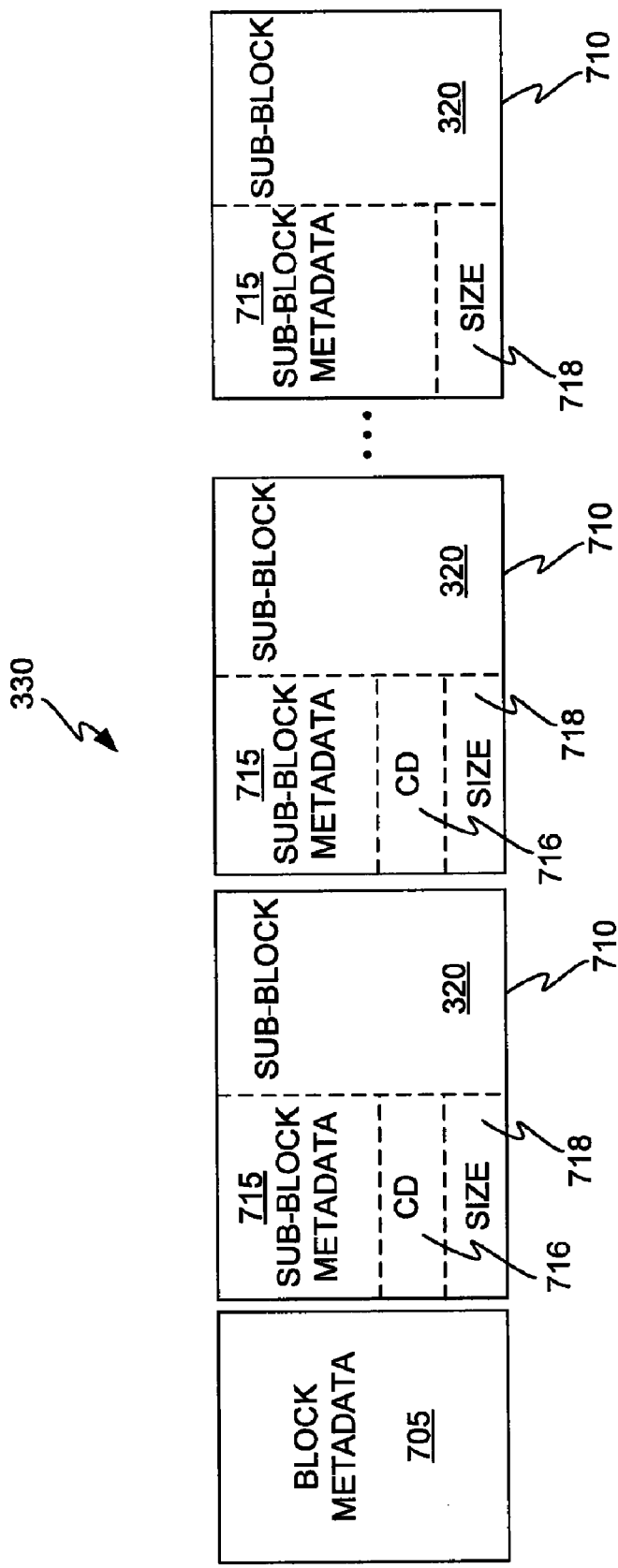
FIG. 7 is a diagram showing the format in which a compressed and encrypted data block is written to a tape of an ESCON tape system in accordance with an illustrative embodiment of the invention.

FIG. 7 is a diagram showing the format in which a compressed and encrypted data block 330 is written to a tape of ESCON tape system 110 in accordance with an illustrative embodiment of the invention. Compressed and encrypted data block 330 begins with block metadata 705 and continues with a series of data-transfer units 710, each data-transfer unit 710 including sub-block metadata 715 and a compressed and encrypted sub-block 320 with which that sub-block metadata 715 is associated.

In some embodiments, data encryption apparatus 100 does not initiate the writing of data to ESCON tape system 110 until ESCON tape system 110 has accepted the write command. Getting ESCON tape system 110 to accept the write command requires informing ESCON tape system 110 how much data is to be written. The difficulty arises, however, that, due to the division of the data into sub-blocks and pipelining, the amount of data to be written is unknown at the outset. Further, data encryption apparatus 100 cannot receive data from computer 105 and divide it into sub-blocks 310 until it has informed computer 105 that ESCON tape system 110 has accepted the write command. Thus, a "Catch 22" situation results. In these embodiments, this difficulty is overcome by first writing block metadata 705 to ESCON tape system 110. Since block metadata 705 has a known size, data encryption apparatus 100 issues to ESCON tape system 110 a request to write data of that known size, and ESCON tape system 110 accepts the command. The acceptance of this initial write command by ESCON tape system 110 then enables encryption apparatus 100 to receive and process data from computer 105 to be written to ESCON tape system 110.

Block metadata 705 contains information such as revision information concerning block metadata 705 and sub-block metadata 715. This revision information indicates the size of block metadata 705 and sub-block metadata 715 in accordance with a particular version of the encrypted-data tape format. In the illustrative embodiment of FIG. 7, each of block metadata 705 and sub-block metadata 715 has a fixed size.

Each compressed and encrypted sub-block 320 that is stored on the tape has its own associated sub-block metadata 715. In the embodiment shown in FIG. 7, the sub-block metadata 715 associated with a particular compressed and encrypted sub-block 320 immediately precedes that compressed and encrypted sub-block 320 on the tape. The sub-block metadata 715 associated with a given compressed and encrypted sub-block 320 includes an indication of whether that compressed and encrypted sub-block 320 is the last compressed and encrypted sub-block 320 in the compressed and encrypted data block 330. In the illustrative embodiment shown in FIG. 7, that indication is the presence or absence of a chained-data indicator ("CD") 716. The sub-block metadata 715 associated with and preceding the last compressed and encrypted sub-block 320 does not include CD 716.

The sub-block metadata 715 associated with each compressed and encrypted sub-block 320 also includes information such as the size, on the tape, of that compressed and encrypted sub-block 320 and the size of the original uncompressed and unencrypted sub-block 310 to which that compressed and encrypted sub-block 320 corresponds. These respective sizes are represented collectively as size 718 in FIG. 7.

As will be discussed below, the format shown in FIG. 7 facilitates the reading back of the compressed and encrypted data from ESCON tape system 110 in response to a request from computer 105.

Figure 8A:
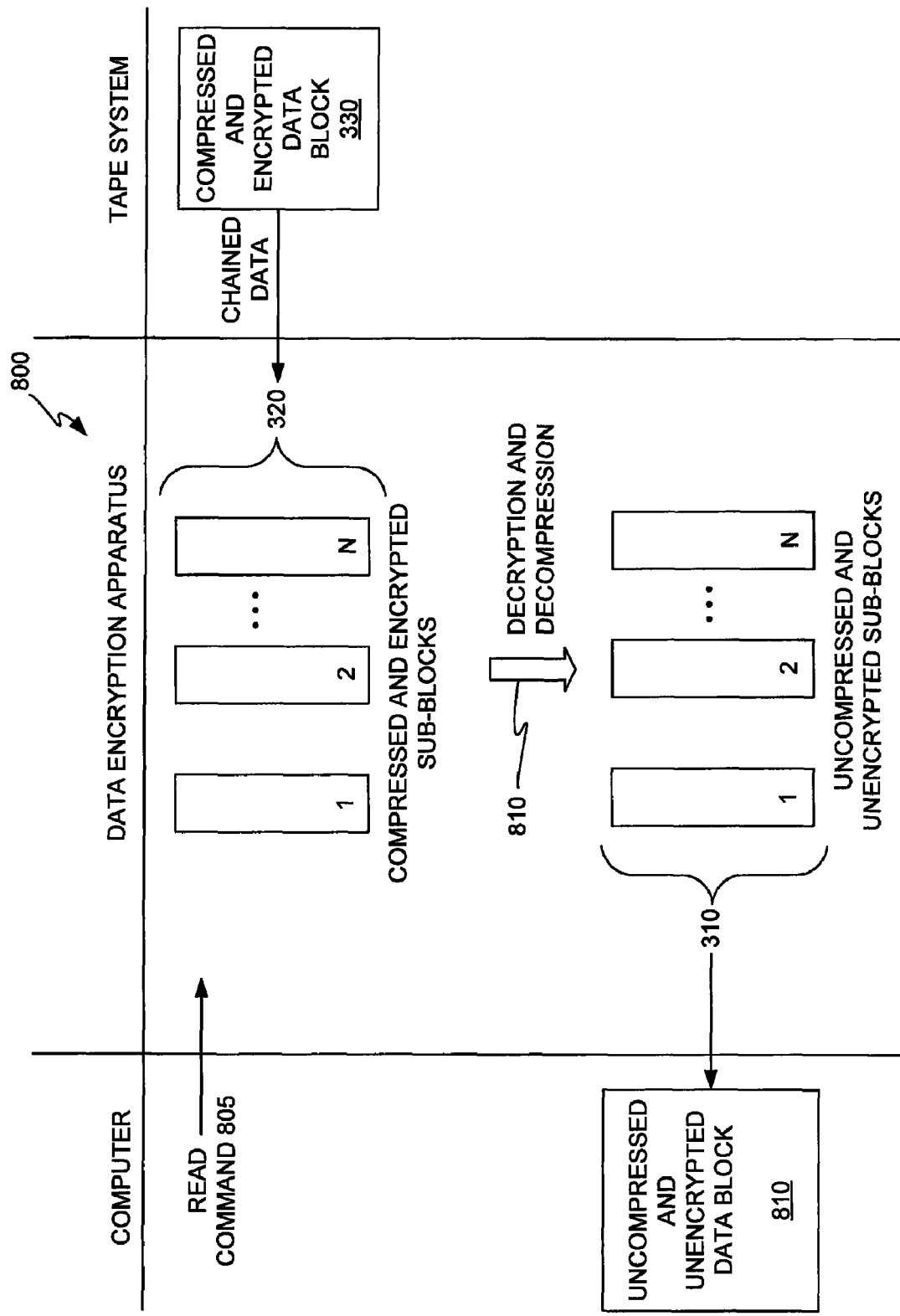
FIG. 8A is a data flow diagram illustrating how encrypted data is read from an ESCON tape system in accordance with an illustrative embodiment of the invention.

FIG. 8A is a data flow diagram illustrating how encrypted data is read from ESCON tape system 110 in accordance with an illustrative embodiment of the invention. Master control logic 150 receives via ESCON-compatible communication module 130 a read command 805 from computer 105 to read a compressed and encrypted data block 330 from ESCON tape system 110. Master control logic 150 reads from ESCON tape system 110 via ESCON-compatible communication module 140 the compressed and encrypted sub-blocks 320 making up the compressed and encrypted data block 330. In doing so, master control logic 150 employs data chaining in this embodiment.

Data compression and encryption subsystem 135 decrypts and decompresses each compressed and encrypted sub-block 320 (decryption and decompression 810) to produce a corresponding uncompressed and unencrypted sub-block 310. These uncompressed and unencrypted sub-blocks 310 correspond to the original sub-blocks 310 discussed in connection with FIGS. 3 and 5.

Master control logic 150 then transmits the uncompressed and unencrypted sub-blocks 310 to computer 105 via ESCON-compatible communication module 130 to form an uncompressed and unencrypted data block 810 on computer 105.

Since, in the foregoing illustrative embodiment, data is read back differently than it is written, the manner in which compressed and encrypted data is read back from ESCON tape system 110 is described in further detail in connection with FIGS. 8B and 9.

Figure 8B:
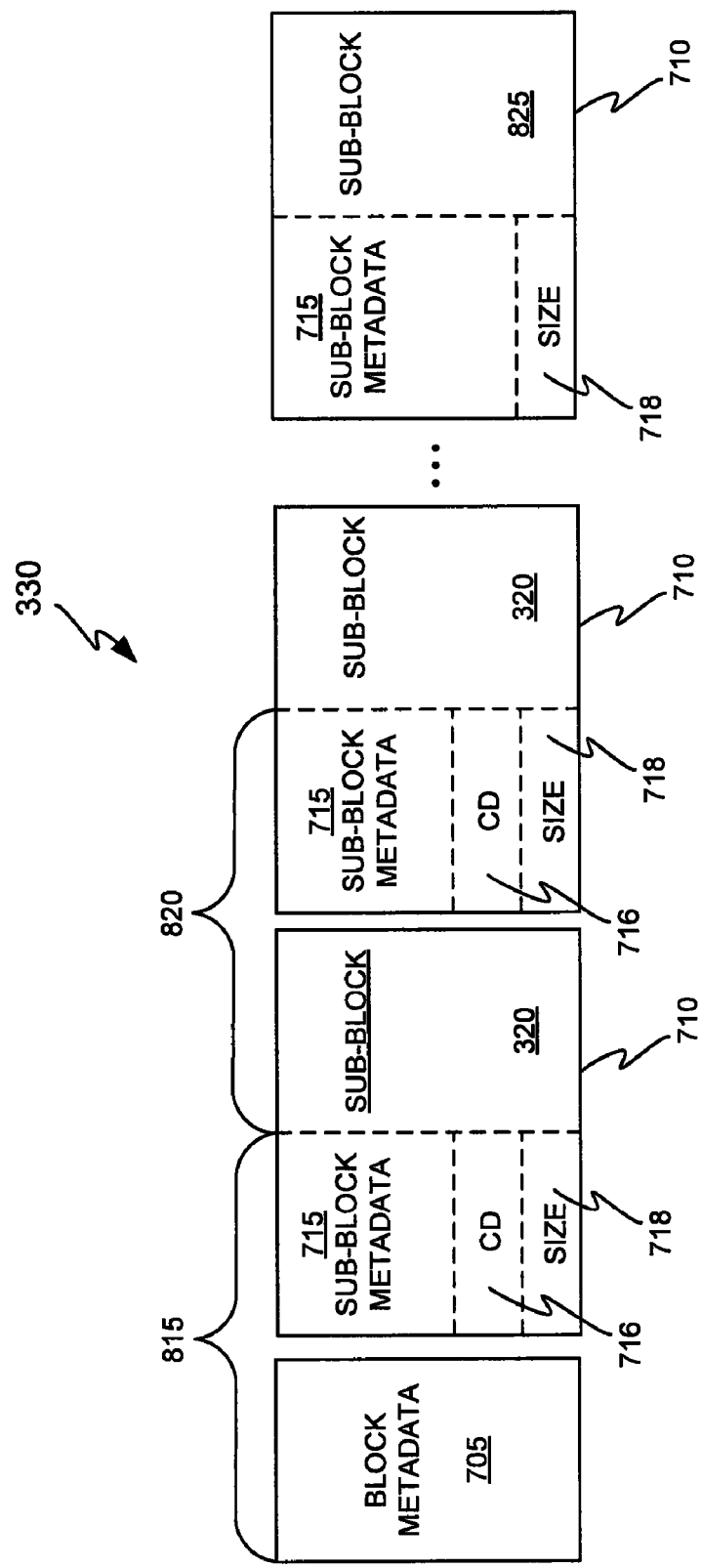
FIG. 8B is a diagram showing in greater detail how a compressed and encrypted data block to be decrypted and decompressed is read from an ESCON tape system in accordance with an illustrative embodiment of the invention.

FIG. 8B is a diagram showing in greater detail how a compressed and encrypted data block to be decrypted and decompressed is read from ESCON tape system 110 in accordance with an illustrative embodiment of the invention. In reading back the compressed and encrypted sub-blocks 320 that are stored on the tape, master control logic 150 first reads, as a unit, block metadata 705 and the sub-block metadata 715 associated with the first compressed and encrypted sub-block 320 in the compressed and encrypted data block 330. The data read during this initial read operation is labeled 815 in FIG. 8B. Recall that the respective fixed sizes of block metadata 705 and sub-block metadata 715 are known from the revision information included in block metadata 705.

Master control logic 150 then reads the first compressed and encrypted sub-block 320 and the sub-block metadata 715 associated with the next (second) compressed and encrypted sub-block 320. The data read during this read operation is labeled 820 in FIG. 8B. Reading a compressed and encrypted sub-block 320 and the sub-block metadata 715 associated with the next compressed and encrypted sub-block 320 is repeated until the last compressed and encrypted sub-block 825 in the compressed and encrypted data block 330 is read. Further details about this last compressed and encrypted sub-block 825 are provided below in connection with FIG. 9.

Reading the data in this fashion enables master control logic 150 to determine the size, on the tape, of the next compressed and encrypted sub-block 320 before it is read. Also, by monitoring CD 716 in the sub-block metadata 715 associated with each compressed and encrypted sub-block 320, master control logic 150 can determine which compressed and encrypted sub-block 320 is the last compressed and encrypted sub-block 825 before it is read.

Figure 9:
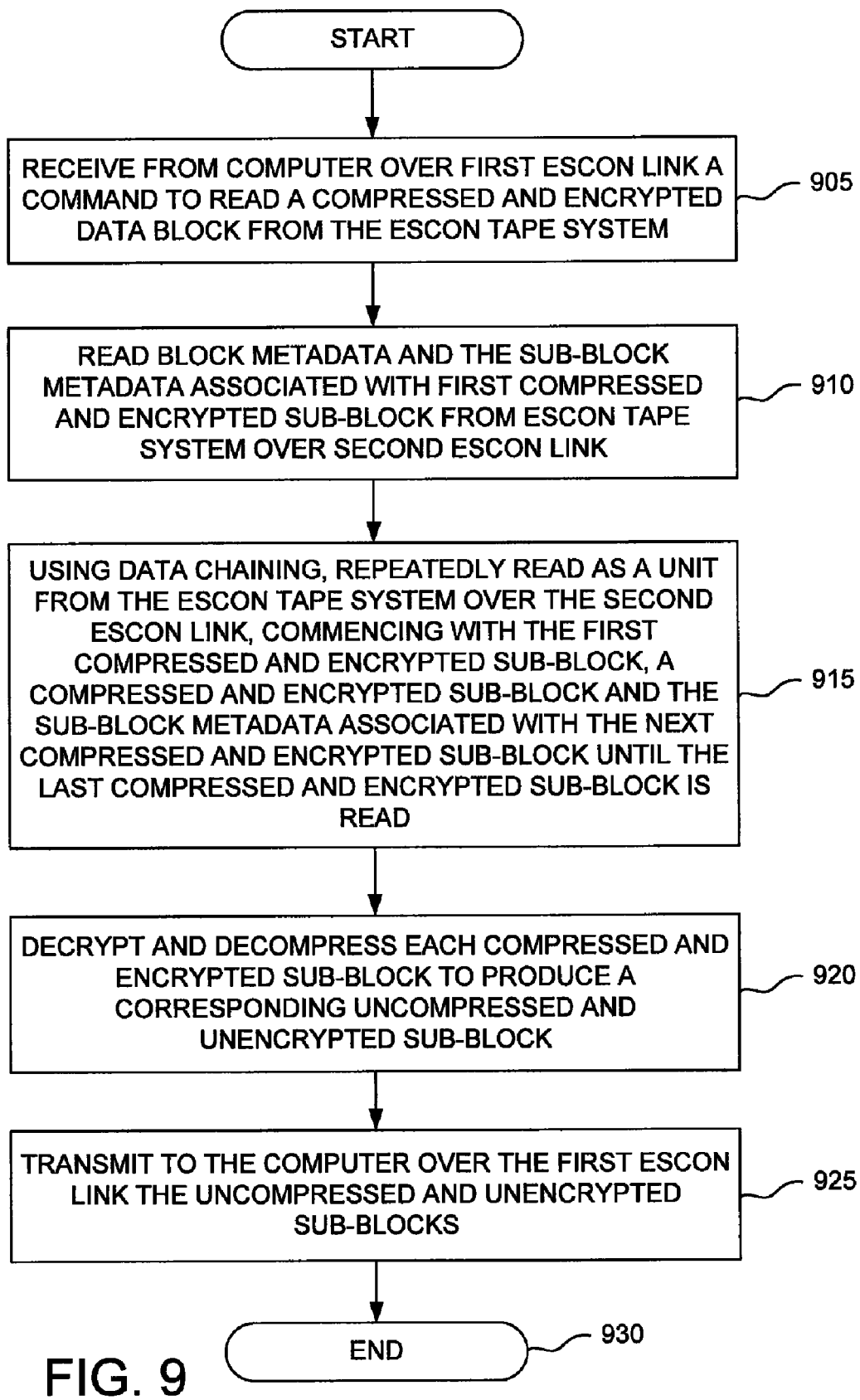
FIG. 9 is a flowchart of a method for reading encrypted data from an ESCON tape system in accordance with an illustrative embodiment of the invention.

FIG. 9 is a flowchart of a method for reading encrypted data from ESCON tape system 110 in accordance with an illustrative embodiment of the invention. At 905, master control logic 150 receives from computer 105 via ESCON-compatible communication module 130 a command to read a compressed and encrypted data block 330 from ESCON tape system 110.

At 910, master control logic reads as a unit from ESCON tape system 110, via ESCON-compatible communication module 140, block metadata 705 and the sub-block metadata 715 associated with the first compressed and encrypted sub-block 320 in compressed and encrypted data block 330. At 915, master control logic 150 reads repeatedly as a unit from ESCON tape system 110, via ESCON-compatible communication module 140, a compressed and encrypted sub-block 320 and the sub-block metadata 715 associated with the next compressed and encrypted sub-block 320 on the tape until the last compressed and encrypted sub-block 825 is read. When the last compressed and encrypted sub-block 825 is read, there is no further sub-block metadata 715 to read because all sub-block metadata 715 has already been read at that point. In performing Block 915, master control logic may make use of data chaining, as explained above.

At 920, data compression and encryption subsystem 135 decrypts and decompresses each compressed and encrypted sub-block 320 that has been read to produce a corresponding uncompressed and unencrypted sub-block 310. At 925, master control logic 150 transmits the uncompressed and unencrypted sub-blocks 310 to computer 105 via ESCON-compatible communication module 130. At 930, the process terminates.

In some embodiments, data encryption apparatus 100 employs one or more cyclic redundancy checks (CRCs), other error detection and correction techniques, or both to ensure the integrity of the data that is transmitted by data encryption apparatus 100. In one illustrative embodiment, a CRC is calculated for the original uncompressed and unencrypted data received from computer 105, and the CRC is stored with the data on the tape. Though this approach enables data encryption apparatus 100 to detect that erroneous data has been read back, it does not prevent erroneous data from being written to ESCON tape system 110.

In another embodiment, a CRC is computed for the original uncompressed and unencrypted data, and a second CRC is computed for the compressed and encrypted data. The CRC of the compressed and encrypted data is checked before the compressed and encrypted data is transmitted from data encryption apparatus 100.

In yet another embodiment, newly compressed and encrypted data is fed to a parallel decryption/decompression loop within data encryption apparatus 100 before the newly compressed and encrypted data is released (transmitted) by data encryption apparatus 100. This enables data encryption apparatus 100 to check the integrity of the "looped back" (decrypted and decompressed) data by comparing its CRC with that of the original uncompressed and unencrypted data before the newly compressed and encrypted data is released. This ensures that accurate data is transmitted to ESCON tape system 110. Analogous techniques can be used to ensure the integrity of data read back from ESCON tape system 110 that is decrypted, decompressed, and transmitted to computer 105.

To provide low latency, data encryption apparatus is configured, in some embodiments, to operate in a pipelined fashion. For example, during the writing of compressed and encrypted data to ESCON tape system 110 (refer to FIG. 1B), data encryption apparatus 100 can be configured such that ESCON-compatible communication module 130, data compression and encryption subsystem 135, and ESCON-compatible communication module 140 are configured to process simultaneously a first sub-block 310, a second sub-block 310, and a compressed and encrypted sub-block 320 corresponding to a third sub-block 310, respectively. In other words, each of these three subsystems of data apparatus 100 can be configured to process a different sub-block at the same time.

The same pipelining technique can be applied to read operations with respect to computer 105 except that the direction of data flow is reversed. That is, ESCON-compatible communication module 140, data compression and encryption subsystem 135, and ESCON-compatible communication module 130 are configured to process simultaneously a first read compressed and encrypted sub-block 320, a second read compressed and encrypted sub-block 320, and an uncompressed and unencrypted sub-block 310 corresponding to a third read compressed and encrypted sub-block 320, respectively.

Using the foregoing pipelining techniques, data encryption apparatus 100 can operate in a manner that incurs no more latency than the time required to process the first and last sub-blocks in a data block.

As data flows in either direction through data encryption apparatus 100, a separate DTCB 165 (refer to FIG. 1C) can be used to track each sub-block, whether the sub-block is clear data or compressed and encrypted data. In one embodiment, DTCBs 165 are stored contiguously in a data structure within memory 125. Each DTCB 165 contains information about its corresponding sub-block. Such information may include the compressed and encrypted or uncompressed and unencrypted size of the corresponding sub-block. In some situations, other information such as CD 716 (chained-data indicator) may be copied from sub-block metadata 715 and included in the DTCB 165. This latter technique is useful in preserving needed information for reading back compressed and encrypted data when a read request from computer 105 spans more than one compressed and encrypted sub-block 320 on the tape.

In conclusion, the present invention provides, among other things, a method and apparatus for writing encrypted data to an ESCON tape system and for reading encrypted data from such a tape system and decrypting the encrypted data. Those skilled in the art can readily recognize that numerous variations and substitutions may be made in the invention, its use, and its configuration to achieve substantially the same results as achieved by the embodiments described herein. Accordingly, there is no intention to limit the invention to the disclosed exemplary forms. Many variations, modifications, and alternative constructions fall within the scope and spirit of the disclosed invention as expressed in the claims.

What is claimed is:

1. A method for writing encrypted data to an Enterprise System Connection (ESCON) tape system, the method comprising:

receiving from a computer over a first ESCON link a command to write a data block of specified size to the ESCON tape system;

requesting data constituting the data block from the computer in sub-blocks, each sub-block being smaller in size than the data block when the data block is larger than a sub-block;

compressing and encrypting each sub-block to produce a corresponding compressed and encrypted sub-block; and transmitting to the ESCON tape system over a second ESCON link the compressed and encrypted sub-blocks using a series of chained-data write operations, the transmitted compressed and encrypted sub-blocks forming a compressed and encrypted data block on a tape of the ESCON tape system;

wherein the compressed and encrypted data block includes fixed-size block metadata including information about the compressed and encrypted data block, each compressed and encrypted sub-block is immediately preceded by associated fixed-size sub-block metadata including information about that compressed and encrypted sub-block, and each compressed and encrypted sub-block except for a last compressed and encrypted sub-block is immediately followed by the sub-block metadata associated with a next compressed and encrypted sub-block, the sub-block metadata associated with a first compressed and encrypted sub-block immediately following the block metadata.

2. The method of claim 1, wherein sub-blocks other than a residual sub-block are of equal size.

3. The method of claim 2, wherein each sub-block other than a residual sub-block is 2048 bytes in size.

4. The method of claim 1, wherein the information about the compressed and encrypted data block includes revision information indicating the fixed size of the block metadata and the fixed size of the sub-block metadata, and the information about each compressed and encrypted sub-block includes a size, on the tape, of that compressed and encrypted sub-block and a size of the sub-block to which that compressed and encrypted sub-block corresponds.

5. A method for writing encrypted data to an Enterprise System Connection (ESCON) tape system, the method comprising:

receiving from a computer over a first ESCON link a first series of chained-data write commands associated with a data block of unknown size to be written to the ESCON tape system, each chained-data write command corresponding to a data segment making up a portion of the data block;

requesting data constituting the data block from the computer in units of variable size as needed, depending on the size of each successive data segment, to normalize the data segments into sub-blocks, each sub-block being smaller in size than the data block when the data block is larger than a sub-block;

compressing and encrypting each sub-block to produce a corresponding compressed and encrypted sub-block; and transmitting to the ESCON tape system over a second ESCON link the compressed and encrypted sub-blocks using a second series of chained-data write commands, the transmitted compressed and encrypted sub-blocks forming a compressed and encrypted data block on a tape of the ESCON tape system;

wherein the compressed and encrypted data block includes fixed-size block metadata including information about the compressed and encrypted data block, each compressed and encrypted sub-block is immediately preceded by associated fixed-size sub-block metadata including information about that compressed and encrypted sub-block, and each compressed and encrypted sub-block except for a last compressed and encrypted sub-block is immediately followed by the sub-block metadata associated with a next compressed and encrypted sub-block, the sub-block metadata associated with a first compressed and encrypted sub-block immediately following the block metadata.

6. The method of claim 5, wherein sub-blocks other than a residual sub-block are of equal size.

7. The method of claim 6, wherein each sub-block other than a residual sub-block is 2048 bytes in size.

8. The method of claim 5, wherein the information about the compressed and encrypted data block includes revision information indicating the fixed size of the block metadata and the fixed size of the sub-block metadata, and the information about each compressed and encrypted sub-block includes a size, on the tape, of that compressed and encrypted sub-block and a size of the sub-block to which that compressed and encrypted sub-block corresponds.

9. A method for reading encrypted data from an Enterprise System Connection (ESCON) tape system, the method comprising:

receiving from a computer over a first ESCON link a command to read a compressed and encrypted data block from the ESCON tape system;

reading from the ESCON tape system over a second ESCON link block metadata associated with the compressed and encrypted data block and sub-block metadata associated with a first compressed and encrypted sub-block of the compressed and encrypted data block, the sub-block metadata associated with the first compressed and encrypted sub-block including an indication of the size, on a tape of the ESCON tape system, of the first compressed and encrypted sub-block;

reading repeatedly as a unit from the ESCON tape system over the second ESCON link using data chaining, commencing with the first compressed and encrypted sub-block, a compressed and encrypted sub-block and sub-block metadata associated with a next compressed and encrypted sub-block until a last compressed and encrypted sub-block in the compressed and encrypted data block is read, the sub-block metadata associated with the next compressed and encrypted sub-block including an indication of the size, on the tape, of the next compressed and encrypted sub-block;

decrypting and decompressing each read compressed and encrypted sub-block to produce a corresponding uncompressed and unencrypted sub-block; and transmitting to the computer over the first ESCON link the uncompressed and unencrypted sub-blocks.

10. The method of claim 9, wherein the sub-block metadata associated with each compressed and encrypted sub-block in the compressed and encrypted data block includes an indication of whether that compressed and encrypted sub-block is the last compressed and encrypted sub-block in the compressed and encrypted data block.

11. The method of claim 9, wherein the uncompressed and unencrypted sub-blocks other than a residual uncompressed and unencrypted sub-block are of equal size.

12. The method of claim 11, wherein each uncompressed and unencrypted sub-block other than a residual sub-block is 2048 bytes in size.

13. A data encryption apparatus for writing encrypted data to an Enterprise System Connection (ESCON) tape system, the data encryption apparatus comprising:

a processor;

a memory connected with the processor;

a first ESCON-compatible communication module capable of being connected with a computer over a first ESCON link;

a second ESCON-compatible communication module capable of being connected with an ESCON tape system over a second ESCON link;

a data compression and encryption subsystem; and control logic including a plurality of program instructions residing in the memory, the plurality of program instructions being configured to cause the processor to:

receive from the computer via the first ESCON-compatible communication module a command to write a data block of specified size to the ESCON tape system;

request and receive data constituting the data block from the computer in sub-blocks via the first ESCON-compatible communication module, each sub-block being smaller in size than the data block when the data block is larger than a sub-block, the data compression and encryption subsystem being configured to compress and encrypt each sub-block to produce a corresponding compressed and encrypted sub-block; and transmit to the ESCON tape system, via the second ESCON-compatible communication module, the compressed and encrypted sub-blocks using a series of chained-data write operations, the transmitted compressed and encrypted sub-blocks forming a compressed and encrypted data block on a tape of the ESCON tape system;

wherein the compressed and encrypted data block includes fixed-size block metadata including information about the compressed and encrypted data block, each compressed and encrypted sub-block is immediately preceded by associated fixed-size sub-block metadata including information about that compressed and encrypted sub-block, and each compressed and encrypted sub-block except for a last compressed and encrypted sub-block is immediately followed by the sub-block metadata associated with a next compressed and encrypted sub-block, the sub-block metadata associated with a first compressed and encrypted sub-block immediately following the block metadata.

14. The data encryption apparatus of claim 13, wherein, to enable the data encryption apparatus to operate in a pipelined fashion, the first ESCON-compatible communication module, the data compression and encryption subsystem, and the second ESCON-compatible communication module are configured to process simultaneously, respectively, a first sub-block, a second-sub-block, and a compressed and encrypted sub-block corresponding to a third sub-block.

15. The data encryption apparatus of claim 13, wherein each of the first and second ESCON-compatible communication modules includes a plurality of ESCON ports.

16. The data encryption apparatus of claim 13, wherein uncompressed and unencrypted sub-blocks other than a residual uncompressed and unencrypted sub-block are of equal size.

17. The data encryption apparatus of claim 16, wherein each uncompressed and unencrypted sub-block other than a residual uncompressed and unencrypted sub-block is 2048 bytes in size.

18. A data encryption apparatus for writing encrypted data to an Enterprise System Connection (ESCON) tape system, the data encryption apparatus comprising:
a processor;
a memory connected with the processor;
a first ESCON-compatible communication module capable of being connected with a computer over a first ESCON link;
a second ESCON-compatible communication module capable of being connected with an ESCON tape system over a second ESCON link;
a data compression and encryption subsystem; and
control logic including a plurality of program instructions residing in the memory, the plurality of program instructions being configured to cause the processor to:
receive from the computer via the first ESCON-compatible communication module a first series of chained-data write commands associated with a data block of unknown size to be written to the ESCON tape system, each chained-data write command corresponding to a data segment making up a portion of the data block;
request and receive, via the first ESCON-compatible communication module, data constituting the data block from the computer in units of variable size as needed, depending on the size of each successive data segment, to normalize the data segments into sub-blocks, each sub-block being smaller in size than the data block when the data block is larger than a sub-block, the data compression and encryption subsystem being configured to compress and encrypt each sub-block to produce a corresponding compressed and encrypted sub-block; and
transmit to the ESCON tape system, via the second ESCON-compatible communication module, the compressed and encrypted sub-blocks using a second series of chained-data write commands, the transmitted compressed and encrypted sub-blocks forming a compressed and encrypted data block on a tape of the ESCON tape system;
wherein the compressed and encrypted data block includes fixed-size block metadata including information about the compressed and encrypted data block, each compressed and encrypted sub-block is immediately preceded by associated fixed-size sub-block metadata including information about that compressed and encrypted sub-block, and each compressed and encrypted sub-block except for a last compressed and encrypted sub-block is immediately followed by the sub-block metadata associated with a next compressed and encrypted sub-block, the sub-block metadata associated with a first compressed and encrypted sub-block immediately following the block metadata.

19. The data encryption apparatus of claim 18, wherein, to enable the data encryption apparatus to operate in a pipelined fashion, the first ESCON-compatible communication module, the data compression and encryption subsystem, and the second ESCON-compatible communication module are configured to process simultaneously, respectively, a first sub-block, a second sub-block, and a compressed and encrypted sub-block corresponding to a third sub-block.

20. The data encryption apparatus of claim 18, wherein each of the first and second ESCON-compatible communication modules includes a plurality of ESCON ports.

21. The data encryption apparatus of claim 18, wherein uncompressed and unencrypted sub-blocks other than a residual uncompressed and unencrypted sub-block are of equal size.

22. The data encryption apparatus of claim 21, wherein each uncompressed and unencrypted sub-block other than a residual uncompressed and unencrypted sub-block is 2048 bytes in size.

23. A data encryption apparatus for reading encrypted data from an Enterprise System Connection (ESCON) tape system, the data encryption apparatus comprising:
a processor;
a memory connected with the processor;
a first ESCON-compatible communication module capable of being connected with a computer over a first ESCON link;
a second ESCON-compatible communication module capable of being connected with an ESCON tape system over a second ESCON link;
a data compression and encryption subsystem; and
control logic including a plurality of program instructions residing in the memory, the plurality of program instructions being configured to cause the processor to:
receive from the computer via the first ESCON-compatible communication module a command to read a compressed and encrypted data block from the ESCON tape system;
read from the ESCON tape system, via the second ESCON-compatible communication module, block metadata associated with the compressed and encrypted data block and sub-block metadata associated with a first compressed and encrypted sub-block of the compressed and encrypted data block, the sub-block metadata associated with the first compressed and encrypted sub-block including an indication of the size, on a tape of the ESCON tape system, of the first compressed and encrypted sub-block;
read repeatedly as a unit from the ESCON tape system via the second ESCON-compatible communication module using data chaining, commencing with the first compressed and encrypted sub-block, a compressed and encrypted sub-block and sub-block metadata associated with a next compressed and encrypted sub-block until a last compressed and encrypted sub-block in the compressed and encrypted data block is read, the sub-block metadata associated with the next compressed and encrypted sub-block including an indication of the size, on the tape, of the next compressed and encrypted sub-block, the data compression and encryption subsystem being configured to decrypt and decompress each read compressed and encrypted sub-block to produce a corresponding uncompressed and unencrypted sub-block; and
transmit to the computer, via the first ESCON-compatible communication module, the uncompressed and unencrypted sub-blocks.

24. The data encryption apparatus of claim 23, wherein, to enable the data encryption apparatus to operate in a pipelined fashion, the second ESCON-compatible communication module, the data compression and encryption subsystem, and the first ESCON-compatible communication module are configured to process simultaneously, respectively, a first read compressed and encrypted sub-block, a second read compressed and encrypted sub-block, and an uncompressed and unencrypted sub-block corresponding to a third read compressed and encrypted sub-block.

25. The data encryption apparatus of claim 23, wherein each of the first and second ESCON-compatible communication modules includes a plurality of ESCON ports.

26. The data encryption apparatus of claim 23, wherein uncompressed and unencrypted sub-blocks other than a residual uncompressed and unencrypted sub-block are of equal size.

27. The data encryption apparatus of claim 26, wherein each uncompressed and unencrypted sub-block other than a residual uncompressed and unencrypted sub-block is 2048 bytes in size.

\* \* \* \* \*